United States Patent
Anderberg

(12) 
(10) Patent No.: US 6,704,098 B2
(45) Date of Patent: Mar. 9, 2004

(54) METHOD AND ARRANGEMENT FOR THE CONTACTLESS MEASURING OF DISTANCE AND POSITION IN RESPECT OF AIRCRAFT DOCKING PROCEDURES

(75) Inventor: Nils-Erik Anderberg, Trelleborg (SE)

(73) Assignee: FMT International Trade AB, Trelleborg (SE)

( * ) Notice: Subject to any disclaimer, the term of this patent is extended or adjusted under 35 U.S.C. 154(b) by 0 days.

(21) Appl. No.: 10/185,421

(22) Filed: Jun. 29, 2002

(65) Prior Publication Data

US 2003/0227610 A1 Dec. 11, 2003

(30) Foreign Application Priority Data

Jun. 11, 2002 (SE) .............................................. 0201775

(51) Int. Cl.$^7$ .............................. G01C 3/08; G01C 1/00; G01B 11/26
(52) U.S. Cl. ................................. 356/4.01; 356/139.04
(58) Field of Search ............................. 356/4.01–5.15, 356/21, 139.04

(56) References Cited

U.S. PATENT DOCUMENTS

| | | | | |
|---|---|---|---|---|
| 5,625,340 A | * | 4/1997 | Gustavsson | 340/561 |
| 5,889,479 A | * | 3/1999 | Tabel | 340/958 |
| 6,023,665 A | | 2/2000 | Millgard | 702/151 |
| 6,100,964 A | * | 8/2000 | De Cremiers | 356/4.01 |
| 6,389,334 B1 | * | 5/2002 | Castor | 701/3 |
| 6,563,432 B1 | * | 5/2003 | Millgård | 340/961 |

FOREIGN PATENT DOCUMENTS

| | | |
|---|---|---|
| DE | 43 01 637 A1 | 8/1994 |
| WO | WO 93/15416 | 8/1993 |

* cited by examiner

Primary Examiner—Thomas H. Tarcza
Assistant Examiner—Brian Andrea
(74) Attorney, Agent, or Firm—Alfred J. Mangels

(57) ABSTRACT

A method and apparatus for the contactless measuring of distances to aircraft when positioning the aircraft, such as when docking or parking. A scanning laser is arranged in front of the aircraft to be positioned and is directed toward a centerline along which an aircraft is to be moved in the course of positioning the aircraft. The laser emits measuring pulses stepwise or incrementally at different angles to detect a predetermined measurement volume. The laser is calibrated with the distance from the laser to the ground for at least some of the angles, and the distances at those angles is measured during positioning of an aircraft. The measured distances are compared with the calibrated distances, and the laser is considered to have measured the correct distance when there is a predetermined agreement between the measured distance and a calibrated distance corresponding with the same angle.

18 Claims, 2 Drawing Sheets

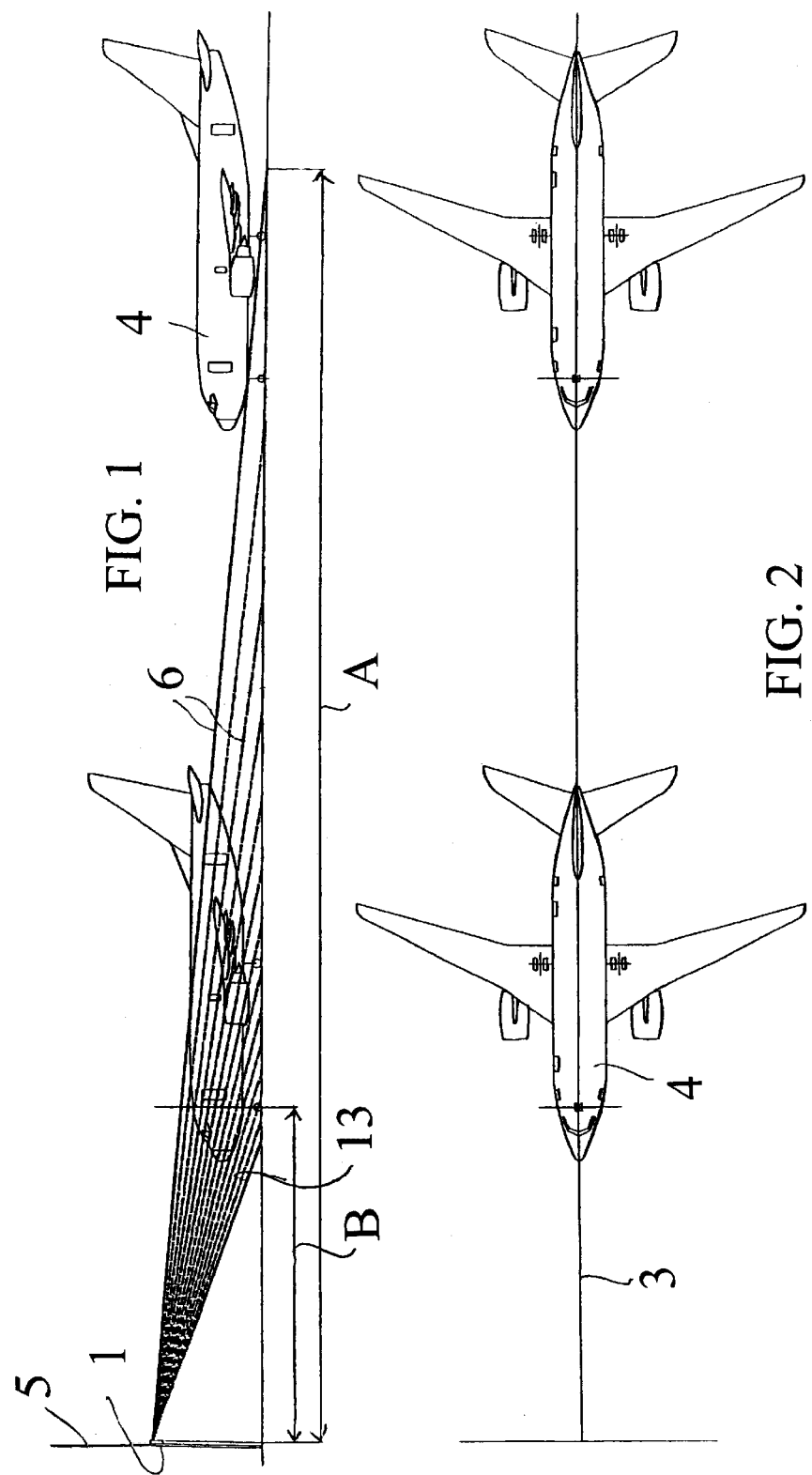

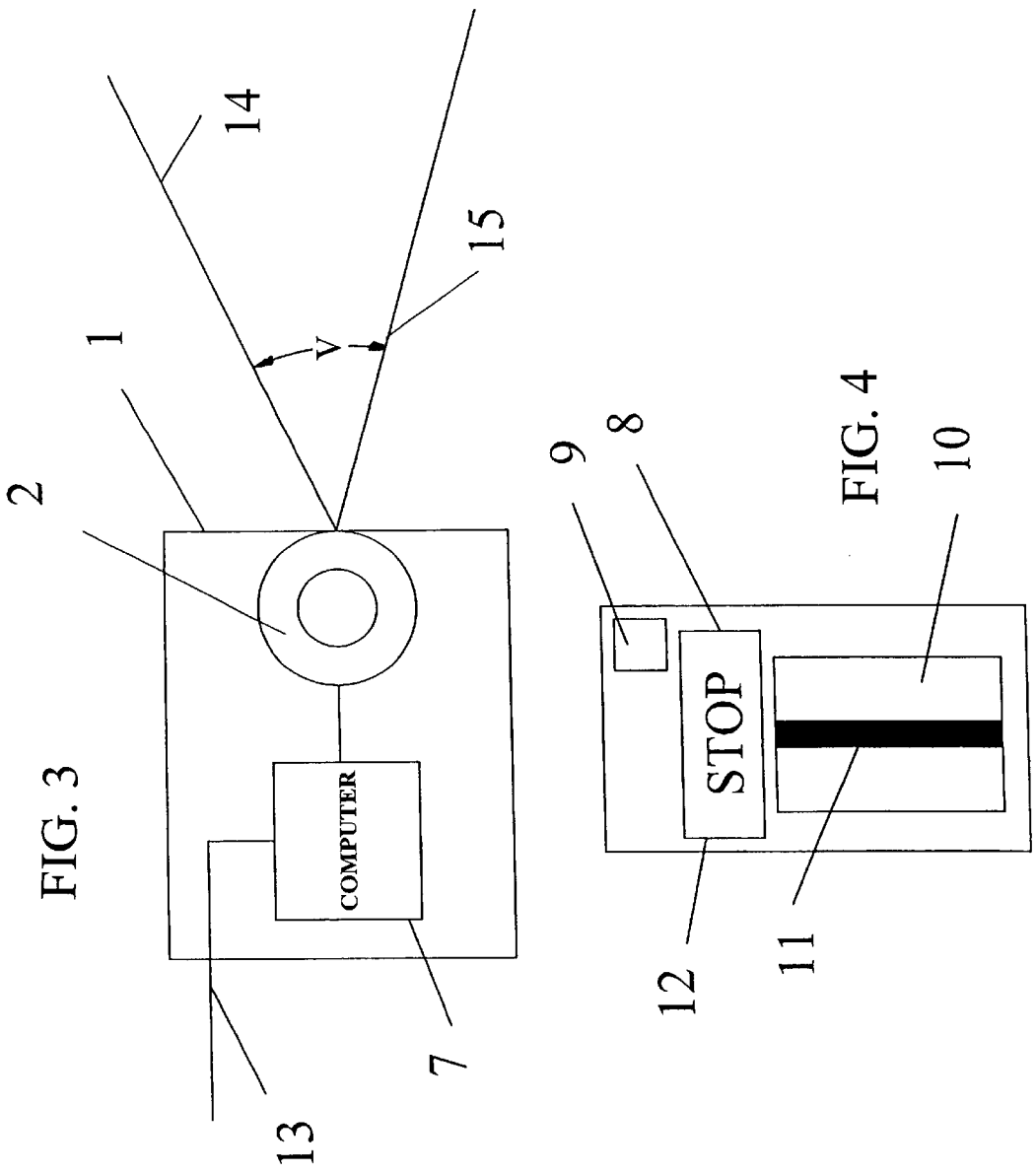

METHOD AND ARRANGEMENT FOR THE CONTACTLESS MEASURING OF DISTANCE AND POSITION IN RESPECT OF AIRCRAFT DOCKING PROCEDURES

BACKGROUND OF THE INVENTION

1. Field of the Invention

The present invention relates to a method for the contactless measuring of distance and position in respect of aircraft docking procedures, and also to an arrangement for that purpose.

2. Description of the Related Art

When docking an aircraft to a so-called gate-associated passenger bridge, it is known to measure the distance of the aircraft from the passenger bridge with the aid of a contactless measuring process. That measuring process is also applied in the case of so-called remote parking, i.e., when the aircraft is parked on the apron or on the hardstanding of a gate area instead of being docked with a passenger bridge. It is also known to indicate for the pilot the position of the aircraft in relation to the centerline along which the aircraft is to move toward a stop point, at which the door of the aircraft is located in registry with the opening of the passenger bridge, or in some other specific position. The distance measuring procedure is used to indicate the stop point to the pilot. The stop point is individual to different aircraft and is thus located at different distances from the distance measuring device used. Such a docking system is therefore aware of the type of aircraft to be docked and thereby also of the distance between the distance measuring device and a specific part of the aircraft.

It is necessary to measure that distance during the whole of the docking phase, in order to present the current distance on a display positioned in front of the pilot, such that the pilot will be able to judge the speed at which the aircraft approaches the stop point. Should the aircraft proceed beyond the stop point, there is a danger of, e.g., an aircraft wing or engine colliding with ground equipment, resulting in highly expensive repair work.

The technology most used at present for measuring that distance and, in certain instances, the position of the aircraft in relation to the centerline, employs the use of distance measuring lasers. Only a small number of companies are active within this field. Certain of them use that technology. The assignee of the present application, the Swedish company Safegate International AB, and RLG Corporation in the U.S. are among those companies that use that technology.

Honeywell and Siemens are examples of companies that use a video-based technique. The accuracy of a video camera is basically dependent on camera resolution and the measuring distance. Because it is necessary to rely on the contrast between the measured object and the surroundings when using the videobased technique, the result will be influenced by external factors, such as rain, fog, snow, and light conditions. The video technique is therefore less efficient.

The laser technique is superior to the video technique, among other reasons because the measurement obtained will be more exact, by virtue of being highly accurate per se, and also because the measuring points on the measured object, i.e., the aircraft, are small and the surroundings therefore have no real disturbing effect. Moreover, the absolute measuring accuracy does not vary appreciably with distance in the case of laser measuring processes.

However, there is a problem with existing docking systems in which lasers are used. According to international rules and regulations concerning existing equipment, the equipment should, itself, indicate when the measurements obtained are erroneous. No system that fulfils this requirement with complete satisfaction exists at present. This deficiency of existing systems presents a serious hazard, partly because an erroneous distance indication can be given, and partly because an erroneous indication is not presented to the pilot in control of a docking aircraft. Such defective functions in existing systems have resulted in incidents and accidents.

A known laser system is designed so that the distance measuring laser will measure the distance to a known reference for controlling measurement accuracy and function, for instance the distance to a reflector that is positioned in a direction from the laser that differs from the volume within which the laser measures against a docking aircraft. The laser is considered to have measured correctly, when the reference measurement is a distance that is in sufficient accord with the known distance. The measuring procedure is then undertaken solely toward an expected aircraft. The known system does not have the time to check measurement accuracy and function by measuring both against a reflector and carrying out measurements against an aircraft during a docking process at one and the same time. The inability of the known system to perform both of these tasks simultaneously is because the laser is adapted to scan a large number of measuring points in one or two dimensions within the measurement volume, whereas the reference measurement is carried out in a totally different direction. By measurement volume is meant the two-dimensional or three-dimensional space within which the laser scans by emitting respective received laser beams or rays.

Thus, when using this known system there is no knowledge of whether the laser measures the correct distance to an approaching aircraft, or even whether the system measures the distance at all. The laser light emitted may be absorbed by weather conditions that indicate to the laser that the measuring distance lies beyond its range.

The present invention solves this problem.

SUMMARY OF THE INVENTION

The present invention relates to a method for contactless measuring of distance to an aircraft when positioning the aircraft, such as when docking or parking the aircraft. A scanning laser associated with a distance measuring device is directed toward an area along a central line along which an aircraft is intended to be moved in positioning the aircraft, and is situated in front of an aircraft being positioned. The laser is adapted to emit measuring pulses stepwise at different angles to detect a predetermined measurement volume. The laser is calibrated with the distance from the laser to the ground in respect of at least some of the laser beam angles, and it measures the distance at those angles during positioning of an aircraft. The measured distances are compared with the calibrated distance in a computer associated with the distance measuring device. The laser is considered to measure the correct distance when predetermined agreement is reached.

The invention also relates to an arrangement for contactless measurement of the distance to aircraft in an aircraft positioning process, such as when docking or parking an aircraft.

BRIEF DESCRIPTION OF THE DRAWINGS

The invention will now be described in more detail, partly with reference to the accompanying drawings, in which FIG. 1 is a side view of an aircraft shown at two different positions;

FIG. 2 shows an aircraft from above at two different positions;

FIG. 3 is a schematic block diagram illustrating an inventive arrangement; and

FIG. 4 illustrates schematically a display for providing a pilot with aircraft docking information.

DESCRIPTION OF THE PREFERRED EMBODIMENTS

The present invention relates to a method and to an arrangement for the contactless measurement of the distance to an aircraft when positioning the aircraft, such as when docking or parking the aircraft. As shown in FIGS. 1 and 3, the arrangement includes a distance measuring device 1 and associated scanning laser 2. The laser 2 is pointed in the direction of a centerline 3 along which an aircraft 4 is intended to be moved in positioning the aircraft, and is situated in front of the aircraft being positioned. The distance measuring device 1 is normally mounted on a wall 5 of the airport building. Alternatively, it can be mounted on a post or pillar on the airport hardstanding or apron where an aircraft is to be positioned, for example parked, at a place remote from an airport building.

The laser 2 is adapted to send measurement pulses stepwise at different angles, as illustrated schematically in FIG. 1 by lines 6, so as to detect a predetermined measurement volume. Pulse emission is effected with the aid of a laser-carried, moveable mirror onto which laser pulses are directed.

Such a laser emits light pulses in small angular increments of 0.125 degrees. Angular increments of 1 (one) degree are shown in FIG. 1 for the sake of clarity. The known laser is an eye-safe, low-power laser that emits infrared light.

In the example shown in FIG. 1, measuring is shown to be effected by emitting light pulses onto the ground up to a distance A of 100 meters. The shortest measuring distance in FIG. 1 is in the order of 25 meters and is referenced as B, that distance corresponding to a distance of roughly 2 meters in front of the nose wheel of the aircraft 4. That position is the aircraft stop position.

FIG. 1 shows the bundle of laser beams or rays 6 within an included angle of 15 degrees. The distance measuring device 1 including the laser 2 can be placed at a height of, for example, 5 to 10 meters above ground level.

However, laser beams are normally emitted both upwards and downwards, as illustrated in FIG. 3. For example, the angle v is 20 degrees upward and 25 degrees downward, calculated from the horizontal plane.

According to the invention, the laser 2 is calibrated by determining a calibration distance from the laser to the ground with respect to at least some of the laser beam angles, i.e., along certain of the lines 6, which define calibration angles. The laser 2 then measures the distance to the ground at those angles during the positioning of an aircraft 4. The measured distances are compared with the calibrated distances in a computer 7 associated with the distance measuring device 1. The laser is considered to have measured the correct distance when a predetermined correspondence is reached between the measured distances to the ground and the calibrated distances.

The laser is calibrated, after having been fitted and installed, by measuring the distance to the ground in the absence of disturbing objects along the measurement path.

At least some of those measurement values for some of the calibration angles are stored in a memory associated with the computer 7.

The comparison of measured distance values with the calibrated distances stored in the computer 7 is made with current measurement values obtained during the ongoing positioning of an aircraft.

As mentioned earlier, the absolute measurement accuracy does not vary appreciably with the distance in the case of laser measuring processes. That means that it suffices to measure against one or more ground positions, or calibration distances, corresponding with one or more calibration angles.

Known systems for aircraft measuring processes using laser techniques include software by means of which it can be established that measurements are made against an incoming aircraft.

When an aircraft is to be positioned, the aircraft swings in onto the centerline 3, as shown to the right in FIGS. 1 and 2, for instance.

Measurements are taken at different height zones above the ground when an aircraft is expected to arrive. In that regard, the laser beams are not directed so as to meet the ground, but are expected to be reflected by an aircraft. Reflection of such beams or rays is considered to indicate that an aircraft has been detected.

In this respect, it can be ascertained that different proximal distances are obtained in respect of laser pulses emitted at close angles, this disparity in distance corresponding to the shape of the forward part of the aircraft body.

According to the invention, the distance to the ground is also measured during aircraft positioning. It is that measuring process that is illustrated in FIG. 1. FIG. 1 does not illustrate the aforesaid measuring process in different height zones. In the case of the example shown in FIG. 1 the uppermost line 6, corresponding to a given angle, meets the ground beneath the aircraft. If this distance is one of the calibration distances, it is compared with the stored calibration distance. The aircraft continues to move to the left, as viewed in FIG. 1. The aircraft will then break the uppermost line 6, wherein the laser will measure a shorter distance than the distance calibrated for this angle. If, however, the laser measures a distance corresponding to the calibration distances for other calibration angles the laser is still considered to measure correctly. Consequently, the shorter measured distance is measured against and indicates the presence of an object, i.e., the aircraft. Lines 6 are broken successively as the aircraft continues to move to the left, as viewed in FIG. 1.

As a result of the invention, reference measurements to the ground are made constantly, as a result of the distances actually measured being compared with the known calibrated values.

According to a highly preferred embodiment of the invention, the computer compares at least some measured distances to the ground with the calibrated values during the whole of the docking procedure.

Should the laser break down or malfunction, for instance as a result of a computer error, so that the laser does not measure the correct distance at a given angular position in comparison with the calibration distance corresponding with that angular position, that condition will be discovered immediately. The same applies should the laser not be able to measure a distance at a given angular position. That condition can be because the light is not reflected to a sufficient extent or because an object other than an aircraft is present in the aircraft taxiing line, although the absence of a measured distance may equally as well be due to malfunctioning of the distance measuring device.

Measuring against an object solely along the centerline 3 has been dealt with above. In its simplest form, that merely requires the scanning laser to be adapted to scan vertically in one dimension. However, the object may have a certain horizontal width. Moreover, it may be situated to one side of the centerline.

With regard to control measurements made at calibration angles and corresponding distances to the ground, such measurements are meaningless for offcenter objects if the calibration measurements were made on the centerline or on one side of that line.

However, the contactless measurement of distances can also measure the position of the aircraft relative to that centerline. That can be achieved by causing the scanning laser to scan both vertically and horizontally, i.e., in two dimensions. The side of the centerline on which the aircraft is positioned can be detected by virtue of the fact that the distances to the front part of the aircraft are not symmetrical with respect to the centerline.

According to a highly important embodiment of the invention, in the event of a deviation greater than the predetermined correspondence, the computer 7 is adapted to send a signal to the positioning system in which the laser 2 is included. That signal causes an indication to be shown on a display, or a corresponding laser connection, that tells the pilot that the positioning system is not functioning correctly.

FIG. 4 is a schematic illustration of a known display 8. The laser is indicated with a window 9 through which laser beams are sent and received. The reference numeral 10 identifies a leading mark indicator according to Swedish Patent Specification No. 8105509-7, which is based on more technology. When the aircraft is positioned on the centerline, the pilot sees a vertical black dash 11 on the leading mark indicator 10. Such known displays 8 also include text fields in which the type of aircraft is given, among other things. Those displays are often connected by a conduit 13 to a data system (not shown) which is central to the airport and in which information concerning the type of aircraft to be positioned is found, among other things. When the aircraft has reached its stop point, that event is indicated by the word "STOP" presented in the text field 12.

An indication to the pilot that the positioning system is not functioning correctly is suitably effected precisely by causing the computer 7 to display the word "STOP" in the text field of the display 8. That information can be stored in a so-called log-file in the docking system computers and can also be sent to other computer systems both inside and outside the airport.

In FIG. 3, the line 14 denotes the highest directed laser beam for distance measuring, and the line 15 denotes the most downwardly directed laser beam.

According to one preferred embodiment, the laser 2 is aligned so that its measurement volume will include the emission of measurement pulses onto the ground, even when an expected aircraft 4 has reached its stop point during the positioning process. This is illustrated in FIG. 1 with the beams or rays 13 that strike the ground in front of the nose wheel when the aircraft is in its left position, as viewed in FIG. 1.

According to one embodiment, the laser 2 is aligned so that measurement against the ground occurs only beyond the point, as seen from the laser, at which the apron or hardstanding is vacant for the aircraft concerned. It may be so that vehicles and pieces of equipment are located closest to the laser, i.e., between the aircraft stop point and the aircraft structure. In such a case, it may be so that the laser measures the distance to a vehicle or piece of equipment. That distance would not coincide with a corresponding calibrated distance and a false error indication would be shown on the display 8.

According to another embodiment, the maximum measuring distance is determined on a measuring occasion by measuring the distance to the ground, for instance at the commencement of an aircraft positioning process. The distance measuring device 1 then ignores measurement values in respect of objects or the like at distances further away than the maximum measuring distance during the aircraft positioning process.

Although the invention has been described above with reference to a number of exemplifying embodiments, it will be understood that the invention can be modified with respect to the choice of laser, the choice of angle areas, and so on, without departing from the basic concept of the invention. For instance, the function and measuring accuracy of the distance measuring device can be checked against the calibrated distance values that have been obtained when measuring the ground distance during the distance measuring process.

It will therefore be understood that the invention is not restricted to the above described and illustrated exemplifying embodiments thereof and that variations can be made within the scope of the accompanying claims.

What is claimed is:

1. A method for the contactless measuring of distances to aircraft in the process of positioning said aircraft, such as when docking or parking said aircraft at a parking position, said method comprising the steps of:
   a. directing a scanning laser toward an area along a centerline along which an aircraft is moved in the process of positioning of the aircraft, wherein the laser is located in front of an aircraft to be positioned to detect a predetermined measurement volume;
   b. emitting from the laser measuring pulses stepwise at different angles toward the ground and along the centerline;
   c. calibrating the laser by determining a calibrated distance from the laser to the ground for at least some of said angles to define calibration angles;
   d. after calibration of the laser, measuring the distance from the laser to the around at the calibration angles during positioning of an aircraft;
   e. comparing with calibrated distances in a computer associated with a distance measuring device the measured distances from the laser to the ground for laser pulse angles that are not blocked from the ground by the aircraft, whereby the laser is considered to have measured a correct distance when there is a predetermined correspondence of the measured distance with a calibrated distance for a given calibration angle, and measured distances that are measured against the aircraft are then also correct distances.

2. A method according to claim 1, including the step of measuring the lateral position of the aircraft relative to the centerline.

3. A method according to claim 1, including the step of providing a signal indicative of a positioning system malfunction when a there exists a deviation greater than the predetermined correspondence.

4. A method according to claim 1, including the step of aligning the laser so that its measurement volume includes measurement pulses transmitted onto the ground when the aircraft has reached its stop point during the aircraft positioning process.

5. A method according to claim 4, including the step of comparing at least certain measured distances to the ground with calibrated values during an entire aircraft positioning process.

6. A method according to claim 1, wherein the scanning laser scans in a vertical plane.

7. A method according to claim 1, wherein the scanning laser scans in a vertical plane and in a horizontal plane.

8. A method according to claim 1, wherein the laser is positioned so that measurement of the distance to the ground at a point forward of the aircraft also takes place when the aircraft has reached its stop point during the positioning process.

9. A method according to claim 1, including the steps of establishing a maximum measurement distance on the ground from the laser, and disregarding measurement values resulting from objects that are located further away from the laser than the maximum measurement distance.

10. An arrangement for contactless measuring of the distance to aircraft in an aircraft positioning process, such as when docking or parking an aircraft, said arrangement comprising: a distance measuring device to detect a predetermined measurement volume, the device including a scanning laser that is directed toward an area along a centerline along which an aircraft is moved in the positioning process, which laser is located in front of the aircraft to be positioned and emits measuring pulses stepwise toward and alone the centerline and at different angles to the ground, wherein the laser is calibrated by determining a calibrated distance from the laser to the ground for at least some of said angles to define calibration angles, and wherein after calibration the laser measures the distance from the laser to the ground at the calibration angles during positioning of an aircraft; and a computer coupled with the distance measuring device for comparing with the calibrated distances the measured distances from the laser to the ground for laser pulse angles that are not blocked from the around by the aircraft, and wherein the computer considers the measuring result of the laser as a correct distance measurement upon a predetermined correspondence of the measured distance with the calibrated distance for a given calibration angle, and measured distances that are measured against the aircraft are then also correct distances.

11. An arrangement according to claim 10, wherein the computer determines a lateral position of the aircraft relative to the centerline based upon reflected measuring pulses emitted by the laser.

12. An arrangement according to claim 10, including a display coupled with the computer, wherein in the event of a deviation greater than said predetermined correspondence, the computer delivers a signal to the display to provide information to indicate to a pilot that the positioning system is not functioning correctly.

13. An arrangement according to claim 10, wherein the laser is positioned so that its measurement volume includes measurement pulses transmitted onto the ground when an aircraft has reached its stop point during the aircraft positioning process.

14. An arrangement according to claim 13, wherein the computer compares at least certain measured distances to the ground with calibrated values during an entire aircraft positioning process.

15. An arrangement according to claim 10, wherein the scanning laser scans in a vertical plane.

16. An arrangement according to claim 10, wherein the scanning laser scans in a vertical plane and in a horizontal plane.

17. An arrangement according to claim 10, wherein the laser is positioned so that measurement of the distance to the ground at a point forward of the aircraft also takes place when the aircraft has reached its stop point during the positioning process.

18. An arrangement according to claim 10, wherein a maximum measurement distance on the ground from the laser is measured, and the computer disregards measurement values resulting from objects that are located further away from the laser than the maximum measurement distance.

* * * * *

UNITED STATES PATENT AND TRADEMARK OFFICE
CERTIFICATE OF CORRECTION

PATENT NO. : 6,704,098 B2
DATED : March 9, 2004
INVENTOR(S) : Nils-Erik Anderberg It is certified that error appears in the above-identified patent and that said Letters Patent is hereby corrected as shown below:

Column 6,
Line 49, "around" should read -- ground --; and

Column 7,
Line 32, "alone" should read -- along --.

Signed and Sealed this

Twenty-fifth Day of May, 2004

JON W. DUDAS
*Acting Director of the United States Patent and Trademark Office*